Jan. 16, 1945.   O. A. KUHLER   2,367,409
INTERLOCK
Filed Jan. 21, 1944

INVENTOR
OTTO A. KUHLER
BY
ATTORNEYS

Patented Jan. 16, 1945

2,367,409

UNITED STATES PATENT OFFICE 2,367,409

INTERLOCK

Otto A. Kuhler, Blauvelt, N. Y.

Application January 21, 1944, Serial No. 519,147

11 Claims. (Cl. 220—15)

This invention relates to structures in which one element receives another within an opening provided therefor with formation of a more or less permanent assembly.

A general object of the invention is to provide in such a structure an improved construction of the elements which are to be locked and/or sealed in their assembled relation by a gasket and an improved gasket construction which facilitates both the ready assemblage of the elements in their desired ultimate relation to each other and also the retention of the elements in the assembled relation, and, if required, a sealing of the joint all as a mere incident of a simple assembling operation.

Another object of the invention is to provide for thermal or other insulation of one of the elements from the other in structures to which the invention is applicable. Another object of the invention is to provide a structure in which one of the elements constitutes a chamber, or the lining of a chamber, having a closure and in which the gasket which locks the elements together and seals the joint therebetween serves also as a sealing strip or gasket for the said closure.

The invention is herein shown as embodied in a structure, such, for example, as a refrigerator, a thermal food container or a hot serving tray, in which the problem is to prevent conduction of heat either outwardly or inwardly. These structures, as now usually manufactured, comprise outer and inner walls or shells often of some good heat conducting material, such as metal, and it is important that these walls, in the assembled structure, be insulated from each other to prevent the conduction of heat either outwardly or inwardly, according as the structure is intended to maintain its contents either hot or cold. For sanitary reasons the inner walls of food containing structures are usually extended to and about the opening into the food receiving chamber in order to avoid crevices in the chamber itself in which dirt can accumulate. For the sake of appearances the outer wall is also usually brought into proximity to the inner wall in the same region. This usually means, therefore, that the desired insulation between the two walls must, at least in part, be located about the opening into the chamber of which the inner wall forms the lining.

A particular object of this invention is so to construct the proximate edges of the two walls that an insulating gasket of resilient material and of a novel contour in cross section will serve not only to insulate the inner and outer walls of the structure from each other but also to lock and seal the elements of the structure in the desired assembled relation to each other.

An important feature of the invention is the construction of the proximate edges of the two elements of the structure and the construction of the gasket so that the elements will be of similar inner and outer contours, respectively, but of sufficient size difference to be free to move transversely to each other before the gasket has been inserted therebetween and that, when the resilient gasket is placed in position between these elements preparatory to assembling, the assembling movement will first effect a compression of the resilient gasket to permit the aforesaid relative transverse movement of the elements of the structure and that thereafter, when the transverse movement is completed, an expansion of the gasket into locking relation to said elements will take place.

Although the invention obviously has an important field of usefulness in the locking in assembled relation and the insulation from each other of the outer and inner walls of structures in which it is desired to prevent the ready conduction of heat either outwardly or inwardly, it will be obvious that its utility is not limited to this field.

Other objects and important features of the invention to which attention has not here been specifically directed will appear hereinafter when the description and claims are considered in connection with the accompanying drawing, in which Figure 1 is a section through the gasket and other elements of a structure embodying the present invention assembled ready for interlocking of the parts;

Figure 1:
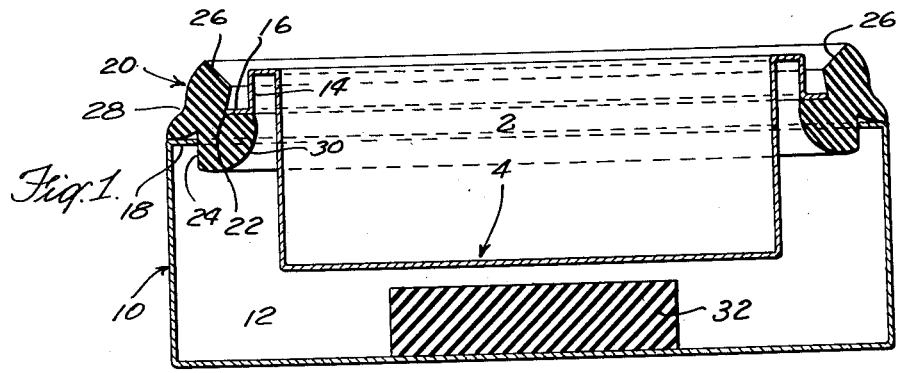

The illustrative embodiment of the invention shows a structure having therein a hot or cold compartment or chamber 2 enclosed within a lining or inner wall 4. The opening by which access to the compartment is obtained will normally be closed by any suitable closure such as the cover or door 6. The cover or door 6 may be of the usual construction of closures for modern heat insulated compartments or chambers and may comprise a metal shell within which any suitable insulation is confined. Likewise, the lining 4, which may be of any suitable material, such as porcelain, glass, enameled steel or stainless steel, etc., as insulated from the exterior wall 10 of the structure (which may be made of the same or different material as the wall 4) by any suitable insulation located within the space 12 between the inner and outer walls. If the structure is to be used merely as a temporary serving tray the confined air alone in the space 12 may afford satisfactory insulation.

As herein shown, the inner wall 4 of the structure, that is, the wall that bounds or lines the hot or cold compartment 2, extends also part way across the top or front of the main or body part of the structure and is bent inwardly and then laterally to form a marginal wall 14 and a peripheral flange portion 16 having an edge contour corresponding substantially to the peripheral contour of the inner chamber 2. It will be understood, of course, that this peripheral contour may be varied if it is desired to have the outside wall of the structure have a different peripheral contour from the peripheral contour of the chamber 2. The important thing, in the illustrative embodiment of the invention, is that the turned-in flange 18 on the outer wall 10 which is to cooperate with the flange 16 on the marginal wall 14 shall have an inner edge contour like the peripheral contour of the edge of the flange 16 but of somewhat greater size. It will be seen that the flange 18 on the outer wall 10 forms on its inner face a shoulder which cooperates with the shoulder formed by the under face of the flange 16 of the inner wall 4 and with the marginal wall 14 and the inner face of the wall 10 to confine the gasket 20, now to be described, in locking position when the two elements 4 and 10 of the structure are in their assembled permanent relation to each other.

As shown particularly in Figure 1, the gasket 20, in its unassembled condition, has a cross section particularly adapted to facilitate both the preliminary assembling of the parts of the structure and the locking of them in their permanent assembled condition. As shown in cross section in Figure 1, the gasket 20 is provided with two V-shaped grooves 22 and 24 intended to receive the marginal edges of the flanges 16 and 18 respectively when the structure is assembled. To provide a substantially square shoulder on the gasket 20 to be received in the shoulder angle formed between the marginal wall 14 and the flange 16 on the inner wall 4, the gasket is provided with a face 26 lying at substantially right angles to one side of the groove 22. That face 28 of the gasket which is exposed in the assembled structure may have any desired sectional contour to adapt it for use as a closure sealing gasket for the closure 6.

To facilitate the assembling operation the face 30 of the gasket which, in the assembled condition of the structure, forms, with one side of the slot 24, a shoulder cooperating with the shoulder angle formed between the flange 18 and the inner surface of the outer wall 10, is preferably curved in cross section as shown.

The distance between the bottoms of the V grooves 22 and 24 is preferably more than the distance between the marginal edges of the flanges 16 and 18, when the flanges 16 and 18 are brought into the same plane, so that there will be a compression of the gasket between these edges at this point, the gasket being preferably formed of some permanently resilient material such as rubber. Moreover, as shown particularly in Figure 3, that dimension of the cross section of the gasket 20 which lies between the face 26 of the gasket and the upper side of the V groove 24 is preferably greater than the distance between the marginal wall 14 and the inner edge of the flange 18 when the parts are in the assembled condition shown in Figure 3, thereby insuring that this part of the gasket will be squeezed between the marginal wall 14 and the inner edge of the flange 18, thus insuring an air and water-tight seal at this point. Furthermore, that dimension of the cross section of the gasket 20 which lies between the lower side of the V groove 22 and that part of the face 36 which engages the inner surface of the outer wall 10 when the parts are in the assembled relation shown in Figure 3 will also preferably be greater than the distance between the peripheral edge of the flange 16 and the inner face of the wall 10. This insures a compression of this part of the resilient gasket 20 between the peripheral edge of the margin 16 and the inner face of the outer wall 10 thus insuring a further sealing of the joint against the penetration thereof by air or moisture.

Figure 2:
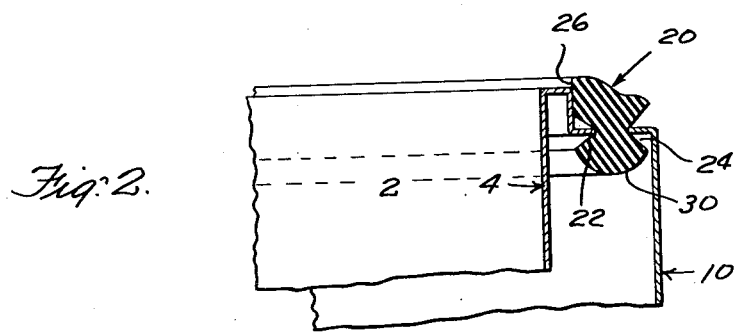
Figure 2 is a fragmentary portion of the structure embodying the present invention with the elements in their intermediate position prior to interlocking.
Figures 3, 4:
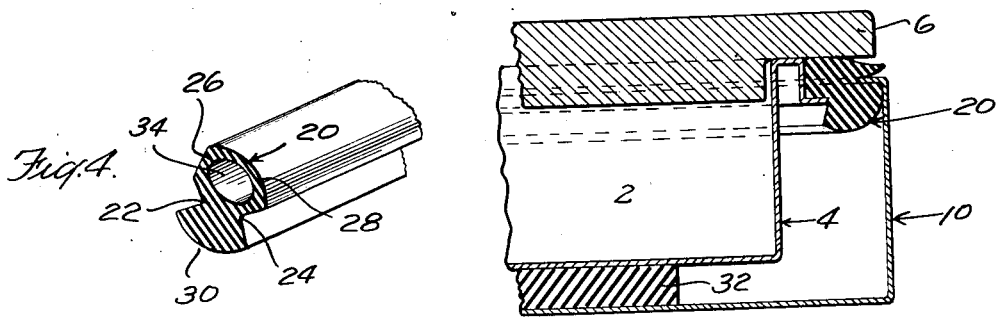
Figure 3 is a section similar to Figure 1 showing the parts in the final interlocked relation.
Figure 4 is a sectioned perspective view of a modified gasket construction.

From an inspection of Figures 2 and 3 it will further be seen that it is important that transverse relative assembling movement of the elements of the structure or, in other words, the movement of the inner shell 4 into the shell formed by the outer wall 10 be limited, both to prevent contact of the two walls 4 and 10 and also to prevent the movement of the shoulder faces and the edges of the flanges 16 and 18 out of proper relation to the joint locking and sealing gasket 20. Means are therefore preferably provided for stopping such relative movement of the parts in the assembling operation, the illustrative means preferably comprising a spacing piece 32, which is also preferably of resilient material such, for example, as the same material of which the gasket 20 is formed. It will be seen from an inspection of Figure 3 that if the spacing piece 32, which, as above stated, is preferably of resilient material, be of sufficient thickness it will insure the maintenance of the inner element 4 and outer element 10 in the assembled relation there shown in which the gasket 20 will be compressed not only between the edge of the flange 18 and the marginal wall 14 but also between the edge of the flange 16 and the inner face of the outer wall 10 and in addition there will be a diagonal compression of the gasket 20 between the edge of the flange 16 and the edge of the flange 18.

A modified form of gasket, designed especially for use where a closure member 6 is to be pressed over the open side of the chamber 4, is shown in Figure 4. It will be noted that the upper part of the gasket shown in Figure 4 is provided with a hollow interior 34. It will further be noted that in the assembled condition of the gasket the outer wall of this hollow interior serves as the closure gasket. Thus the hollow interior not only adds to the insulating effect but gives the outer wall against which the closure abuts a somewhat more ready adaptability to any irregularities in the surface of the closure which abuts thereagainst.

From the foregoing description it will be seen that the invention provides a novel method and means for assembling two elements having the general relationship of the elements herein illustrated and that in the assembled structure there is provided not only thermal insulation of the elements from each other but such a support of one element by the other that it is insulated from the transmission of shocks thereto. Although, as herein shown, the invention is particularly useful in its application to the combined insulation and locking in assembled relation of the parts of structures such as refrigerators, thermal food containers, hot serving trays, etc., in which the problem is to prevent conduction of heat either outwardly or inwardly, it is not limited in its utility to such structures but has a wide field of application. For example, its adaptability to insulation of one element from another both in respect to conduction of heat and transmission of shock makes it applicable to other structures such as modern windows especially where metal frames are used and where it is desired to seal the edges of the window. Other uses of the invention will readily occur to those skilled in the art.

Figure 5:
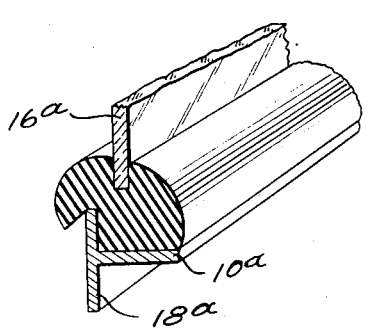
Figure 5 is a perspective view of a modified form of the invention as applied to a light frame.

In Figure 5 of the drawing the angle iron 10a—18a forms the flange and abutment for the outer enlarged portion of the resilient gasket and on the opposite side of the gasket the window pane 16a engages in the reduced central portion of the gasket in the same manner as the flange 16 of the air shell in the device shown in Figures 1 and 4. With this form as with the form of the invention shown in Figures 1 through 4, the parts are first assembled loosely with the pane of glass on the opposite side of the flange 18a and the pane of glass is then pushed into place, first compressing the central portion of the rubber as it passes the flange 18a, and then, when it has passed, compressing the rubber into the corner of the angle iron frame and against the abutment web 10a.

I claim:

1. In a structure of the class described, the combination with an inner element having a peripheral edge of a desired contour and an outer element having an inner edge of like but somewhat larger contour whereby said elements may be assembled by moving said edges transversely past each other and at least one of said elements having an abutment near but spaced from its said edge, of a resiliently depressible gasket serving to form with said edges a locked joint between the assembled elements, said gasket being shaped in cross-section to lie between said edges when they are in adjacent but offset relation and having a central section of thickness greater than, but adapted to be compressed to, the spacing between said edges when in opposed relation and a portion extended therebeyond of thickness greater than the spacing of said abutment from the edge of the other element when in opposed relation to said abutment.

2. In a structure of the class described, the combination with an inner element having a peripheral edge of a desired contour and an outer element having an inner edge of like but somewhat larger contour whereby said elements may be assembled by moving said edges transversely past each other, of a gasket serving to form with the said edges a locked and sealed joint between the assembled elements, said gasket comprising a strip of resilient material of a cross-section shaped to fit between said edges in an unopposed but parallel relation thereof and each of said aforementioned elements being provided with a shoulder against which a portion of said gasket is held by the other element when said edges have been moved transversely past each other into assembled relation.

3. A structure according to claim 1 in which each of said elements is provided with an abutment near but spaced from its edge and against which the gasket is held by the edge of the other element.

4. A structure according to claim 1 in which the gasket has in cross section a reduced waist portion between the inner and outer portions thereof.

5. A structure according to claim 1 in which the inner element constitutes the bounding wall of a chamber having a closure and the outer portion of said gasket serves as a gasket for said closure.

6. A structure according to claim 1 in which means are provided for limiting the relative transverse movement of the elements in the assembling operation.

7. A structure according to claim 1 in which means are provided for limiting the relative transverse movement of the elements in assembling, said means being also formed of resilient material.

8. In a structure of the class described, the combination with an inner element having a peripheral flange provided with an edge of a desired contour and an outer element having an inner flange provided with an edge of like but somewhat larger contour whereby said elements may move transversely to each other in assembling, of a resilient gasket serving to form with said flanges a locked and sealed joint between the assembled elements, said elements being provided adjacent said flanges with opposed walls when in assembled relation whereby a recess, into which the resilient gasket may expand, is provided between said flanges and walls, said gasket comprising a strip of resilient material of a cross section such that when said strip is placed between said edges it will be resiliently pressed as the edges are caused to move transversely to each other in assembling and will be carried by said inner element into a position such that the thus depressed portion can expand into said aforementioned recess to effect the locking of the elements together and the sealing of the joint therebetween.

9. A structure according to claim 1 in which the gasket is provided with opposed V-shaped grooves for receiving the edges of the respective elements.

10. A structure according to claim 1 in which each of the offset edges of the two elements in the assembled structure is opposed by a wall of the other element against which a portion of said gasket is pressed by said edge into sealing relation.

11. In a structure of the class described, the combination with an inner element having a peripheral edge of a desired contour and an outer element having an inner edge of like but somewhat larger contour whereby said elements may be assembled by moving said edges transversely past each other, of a resilient gasket having a waist portion of reduced thickness adapted to receive said edges respectively on opposite sides thereof and enlarged portions at each side of said waist portion adapted to hold said edges against displacement from the waist portion, said gasket being deformable to permit assembly of said parts and at least a portion thereof being expanded into locking relation when the parts are assembled, so that they cannot be disassembled except by further resilient depression of such expanded part.

OTTO A. KUHLER.